Figure 1:
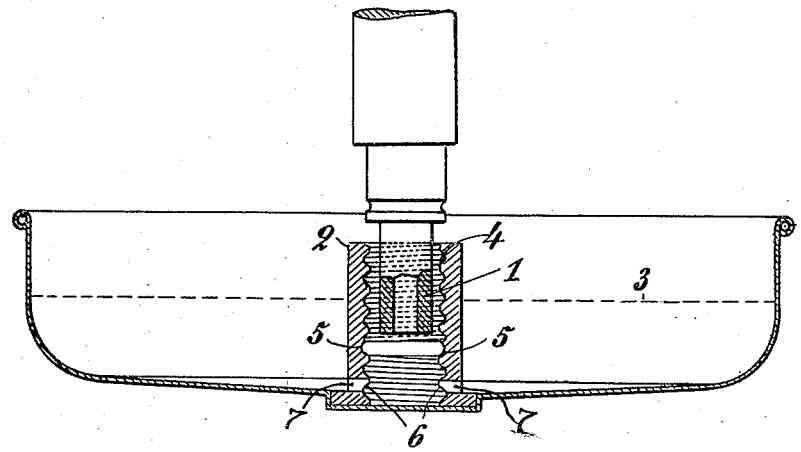

F. MORTENSEN.
CREAM SEPARATOR WITH HANGING BOWL.
APPLICATION FILED APR. 28, 1919.

1,316,849.  Patented Sept. 23, 1919.

Inventor
Frantz Mortensen
By [signature]
Attorney

UNITED STATES PATENT OFFICE.

FRANTZ MORTENSEN, OF COPENHAGEN, DENMARK.

CREAM-SEPARATOR WITH HANGING BOWL.

1,316,849.  Specification of Letters Patent.  Patented Sept. 23, 1919.

Application filed April 28, 1919.  Serial No. 293,306.

*To all whom it may concern:*

Be it known that I, FRANTZ MORTENSEN, managing director, No. 2 Amagerbrogade, Copenhagan, S., subject of the King of Denmark, and residing at Copenhagen, No. 257 Amagerbrogade, Denmark, have invented certain new and useful Improvements in Cream-Separators with Hanging Bowls, of which the following is a specification.

In cream separators with hanging bowls the whole milk is generally sucked into the bowl by means of a pipe descending from the latter. If the lower part of this pipe is submerged in milk in the milk receiver below the above named bowl, the pipe will by the quick rotation of the bowl cause a corresponding rotation of the milk in the receiver which causes a lowering of the milk level around the pipe so that finally the surface of the milk will be at about the same level as the lower end of the pipe whereby air will be sucked past the milk into the pipe. To avoid this defect it would be necessary to make the pipe very long so that it dips deep into the milk, but this may, in several respects prove a disadvantage, *inter alia* because the friction against the rotation thereby is increased and because a long pipe is more liable to be damaged or bent from its centric position, when the separator is being cleaned, etc.

To avoid the said defect the pipe has been arranged in such manner that it ends above the surface of the milk in the receiver being continued, however by a non-rotating short tube attached to the receiver, which tube, in order to cause a suction at the top is made airtight with the rotating pipe. By the suction in the pipe and the short tube, the surface of the milk will, of course rise in the latter, so that it reaches the pipe, wherefrom the milk will be sucked up.

This arrangement, however, proves inadequate, as the tightening device counteracts the free oscillations of the bowl and its self-centering, which movements ought not to be disturbed, besides which the friction against the rotation of the bowl, of course will be greatly increased.

The object of my invention is to relieve all the said defects. The characteristic feature of the invention is that, in a separator, the bowl of which has a pipe of such a length that it submerges into the milk in the milk receiver below the bowl there is employed a tube or the like inclosing the pipe but completely detached from it.

This tube may be fitted, on its inner side, *i. e.* on its side facing the pipe with such screw threads or the like devices that, the rotation of the milk in the receiver caused by the pipe will conduct the milk to the aperture of the pipe. For this purpose the tube may be fitted with two screw-threads of which—reckoned in the rotative direction of the pipe—one descends from the upper edge of the tube, the other rising from the lower part of the tube.

On the drawing are shown two different forms of execution of the invention.

In Figure 1, 1 indicates the pipe which rotates with the centrifugal bowl (not shown) and 2 the tube inclosing same, which tube 2 is applied at some distance from the pipe 1 so that there is a certain air space between the pipe 1 and the tube 2 one or more inlet openings 7 being provided at the lower end of the tube. 3 indicates the container for the supply of whole milk which is to be separated, the dotted line indicating the level of the milk in the container. During the rotation of the bowl and the pipe 1, the milk in the said space is agitated by the rotation. The inner side of tube 2 is fitted with screw-threads, in such a manner that the said threads 4 at the upper part of the tube 2 descend in the rotative direction, besides which on the level with the aperture of the pipe 1, is fitted a horizontal groove or notch 5 limiting the said screw-threads. Below the groove 5, other screw-threads 6 are cut in the side of the wall of the tube, which threads have a pitch in the rotative direction. The milk between pipe 1 and tube 2 participating in the rotation of the pipe, the milk above the groove 5 will be forced down following the threads 4, but below the groove 5 the milk will be forced upward along the threads 6.

The milk surrounding the mouth of the pipe will consequently be exposed to a compression preventing air from being sucked into the pipe through the milk above the aperture of the pipe. The compressed milk remains however yielding to such a degree that it permits the pipe to freely participate in the oscillations of the bowl.

Figure 2:
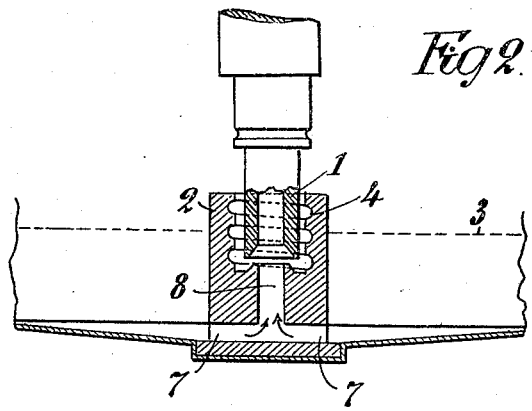

Fig. 2 shows another form of execution of the invention. Here the tube 2 is, as in the former case formed at the top with screw threads 4, which descend in the rotative direction. Below these screw threads, the tube 2 is formed with one or several inlet openings 7, and with a central outlet 8 directed against the aperture of the pipe 1. On account of the descending screw threads 4, the milk between the tube 2 and the pipe 1, will as said above, obtain a downward motion. This flow of milk is met by another upwardly directed flow of milk which, on account of the suction in the pipe 1, will pass in through the inlet openings 7 and out through the outlet 8, the compressive effect on the milk surrounding the aperture of the pipe 1 being the same as mentioned above and the result being the same as regards the air being prevented from passing into the pipe.

Having now described the nature of my said invention, I declare that what I claim is:

1. In a centrifugal separator, the combination, with a rotary bowl and a depending suction pipe connected to said bowl to rotate therewith; of a container for the supply of liquid to be separated located below said bowl; and an upstanding tube in said container into which the suction pipe projects having its inner wall spaced from the outer wall of said pipe and having an inlet for the liquid in its lower portion, the pipe and tube constituting companion elements, one of which is provided with means for conducting the liquid in the space between the pipe and tube to the mouth of said pipe.

2. In a centrifugal separator, the combination, with a rotary bowl and a depending suction pipe connected to said bowl to rotate therewith; of a container for the supply of liquid to be separated located below said bowl; and an upstanding tube in said container into which the suction pipe projects having its inner wall spaced from the outer wall of said pipe and having an inlet for the liquid in its lower portion, the pipe and tube constituting companion elements, one of which is provided with screw threads for conducting the liquid in the space between the pipe and tube to the mouth of said pipe.

3. In a centrifugal separator, the combination, with a rotary bowl and a depending suction pipe connected to said bowl to rotate therewith; of a container for the supply of liquid to be separated located below said bowl; and an upstanding tube in said container into which the suction pipe projects having its inner wall spaced from the outer wall of said pipe and having an inlet for the liquid in its lower portion, said tube being provided upon its inner wall with screw threads for conducting the liquid in the space between the pipe and tube to the mouth of said pipe.

4. In a centrifugal separator, the combination, with a rotary bowl and a depending suction pipe connected to said bowl to rotate therewith; of a container for the supply of liquid to be separated located below said bowl; and an upstanding tube in said container into which the suction pipe projects having its inner wall spaced from the outer wall of said pipe and having an inlet for the liquid in its lower portion, said tube being provided upon its inner wall with upper and lower sets of screw threads, the upper set descending with relation to the direction of rotation of the pipe and the lower set ascending with relation to such direction.

In testimony whereof I affix my signature in presence of two witnesses.

FRANTZ MORTENSEN.

Witnesses:
 CHARLES NERDE,
 E. WEIL STOWE.

Copies of this patent may be obtained for five cents each, by addressing the "Commissioner of Patents, Washington, D. C."